US010372467B2

(12) United States Patent
Yamada et al.

(10) Patent No.: US 10,372,467 B2
(45) Date of Patent: Aug. 6, 2019

(54) INFORMATION PROCESSING APPARATUS AND NON-TRANSITORY COMPUTER-READABLE MEDIUM HAVING PROGRAM INSTALLABLE ON THE SAME

(71) Applicant: SEIKO EPSON CORPORATION, Tokyo (JP)

(72) Inventors: Takeshi Yamada, Nagano (JP); Kazuki Tadachi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/722,046

(22) Filed: Oct. 2, 2017

(65) Prior Publication Data

US 2018/0150307 A1 May 31, 2018

(30) Foreign Application Priority Data

Nov. 28, 2016 (JP) ................................. 2016-229842

(51) Int. Cl.

| G06F 9/44 | (2018.01) |
| G06F 9/445 | (2018.01) |
| G06F 8/61 | (2018.01) |
| G06F 8/65 | (2018.01) |
| G06F 8/71 | (2018.01) |
| G06F 3/12 | (2006.01) |

(52) U.S. Cl.
CPC ............ *G06F 9/44536* (2013.01); *G06F 8/61* (2013.01); *G06F 8/65* (2013.01); *G06F 8/71* (2013.01); *G06F 3/1203* (2013.01); *G06F 3/1225* (2013.01)

(58) Field of Classification Search
None
See application file for complete search history.

(56) References Cited

U.S. PATENT DOCUMENTS

2006/0218541 A1 * 9/2006 Saito .................. G06F 9/44521
717/146
2015/0012913 A1 1/2015 Jin et al.

FOREIGN PATENT DOCUMENTS

| CN | 104281466 A | 1/2015 |
| CN | 105700872 A | 6/2016 |
| JP | 2006-268752 A | 10/2006 |

* cited by examiner

*Primary Examiner* — Qamrun Nahar (57) ABSTRACT

An information processing apparatus that performs a program installation includes a determiner and a display controller. The determiner determines whether or not a manner of installation in which the installation is performed corresponds to an update installation that updates a first program previously installed with a second program to be installed at this time. When the manner of installation corresponds to the update installation, the display controller selects a first display setting for causing a predetermined display unit to display a first user interface screen corresponding to the first program. When the manner of installation does not correspond to the update installation, the display controller selects a second display setting for causing the display unit to display a second user interface screen corresponding to the second program.

9 Claims, 4 Drawing Sheets

INFORMATION PROCESSING APPARATUS AND NON-TRANSITORY COMPUTER-READABLE MEDIUM HAVING PROGRAM INSTALLABLE ON THE SAME

BACKGROUND

1. Technical Field

The present invention relates to an information processing apparatus and a non-transitory computer-readable medium having a program installable on the information processing apparatus.

2. Related Art

When a program is installed on an information processing apparatus, a user is presented with a user interface (hereinafter referred to as "UI") screen that is an operation screen for enabling a user to use functions of the installed program.

JP-A-2006-268752 discloses that one version of a program module that executes a predetermined process is selected from different versions of the program module, and the selected version of the program module executes the predetermined process.

In general, when a program installed on an information processing apparatus is updated or upgraded, a UI screen is also changed to a new version corresponding to the program after the update. However, some users may be used to the design or operability of the version of the UI screen corresponding to the program before the update. Therefore, changing the UI screen to the new version when the program is updated may make it inconvenient for users to use the UI screen.

SUMMARY

An advantage of some aspects of the invention is that an information processing apparatus and a program installable on the information processing apparatus for reducing the inconvenience that users experience when using a UI screen are provided.

An aspect of the invention provides an information processing apparatus that performs a program installation and that includes a determiner and a display controller. The determiner determines whether or not a manner of installation in which the installation is performed corresponds to an update installation that updates a first program previously installed with a second program to be installed at this time. The display controller selects, when the manner of installation corresponds to the update installation, a first display setting for causing a predetermined display unit to display a first UI screen corresponding to the first program, and selects, when the manner of installation does not correspond to the update installation, a second display setting for causing the display unit to display a second UI screen corresponding to the second program.

According to this structure, when updating the previously installed first program by installing the second program, the information processing apparatus causes the display unit to display an old version of the UI screen (the first UI screen) corresponding to the first program before the update, instead of a new version of the UI screen (the second UI screen) corresponding to the second program. This structure makes it possible to prevent a user who is used to the first UI screen to feel the inconvenience caused by a UI screen change, thus continuously providing the user with a comfortable operating environment.

It may be preferable that the information processing apparatus administrate a device having the display unit over a network, that when selecting the first display setting, the display controller transmit, to the device, first data used to display the first UI screen, thereby causing the display unit of the device to display the first UI screen based on the first data, and that when selecting the second display setting, the display controller transmits, to the device, second data used to display the second UI screen, thereby causing the display unit of the device to display the second UI screen based on the second data. This structure provides a user who operates the device administrated via the information processing apparatus with a comfortable operating environment.

The information processing apparatus may preferably include a second display unit different from the display unit. In this case, regardless of whether the first display setting or the second display setting is selected, the display controller may cause the second display unit to display the second UI screen after the second program is installed. According to this structure, after a program is installed, a UI screen corresponding to the installed program is displayed on the second display unit, regardless of whether the first display setting or the second display setting is selected. This structure allows an administrator who operates the information processing apparatus to use a new version of the UI screen (the second UI screen) corresponding to the installed program.

It may be still preferable that the display controller be allowed, after selecting the first display setting, to make a change from the first display setting to the second display setting in accordance with an external operation, and that the display controller be allowed, after selecting the second display setting, to make a change from the second display setting to the first display setting in accordance with the external operation. This structure allows a user to make a display setting change freely even after one of the first display setting and the second display setting is once selected in accordance with the result of determination.

Further, when receiving, from the device, a change command that is associated with a user and that instructs the display controller to change the selected display setting, the display controller may preferably change the selected display setting to one of the first display setting and the second display setting in compliance with the change command only while the user operates the device. This structure allows either the first display setting or the second display setting to be selected according to the preference of a user on a user basis only while the user operates the device.

The technical idea of the invention is realizable in various aspects including the information processing apparatus, which is a machine. For example, the invention is applicable to a system having the information processing apparatus and the device and is also applicable to the device alone.

Further, the invention is applicable to methods corresponding to processes executed by the information processing apparatus and the device, is applicable to a program for causing hardware (i.e., a computer) to execute the processes, and is applicable to a computer-readable medium having the program stored thereon. For example, another aspect of the invention may provide a non-transitory computer-readable medium having stored thereon, a program that is installable on an information processing apparatus and that causes the information processing apparatus to function as a determiner and a display controller. The determiner determines whether or not a manner of installation in which the program is installed corresponds to an update installation that updates the program previously installed with the program to be installed at this time. When the manner of installation corresponds to the update installation, the display controller causes a predetermined display unit to display a first UI screen corresponding to the program previously installed. When the manner of installation does not correspond to the update installation, the display controller causes the display unit to display a second UI screen corresponding to the program installed at this time.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention are described below with reference to the drawings. The drawings are just examples to describe the embodiments.

1. System Outline

Figure 1:
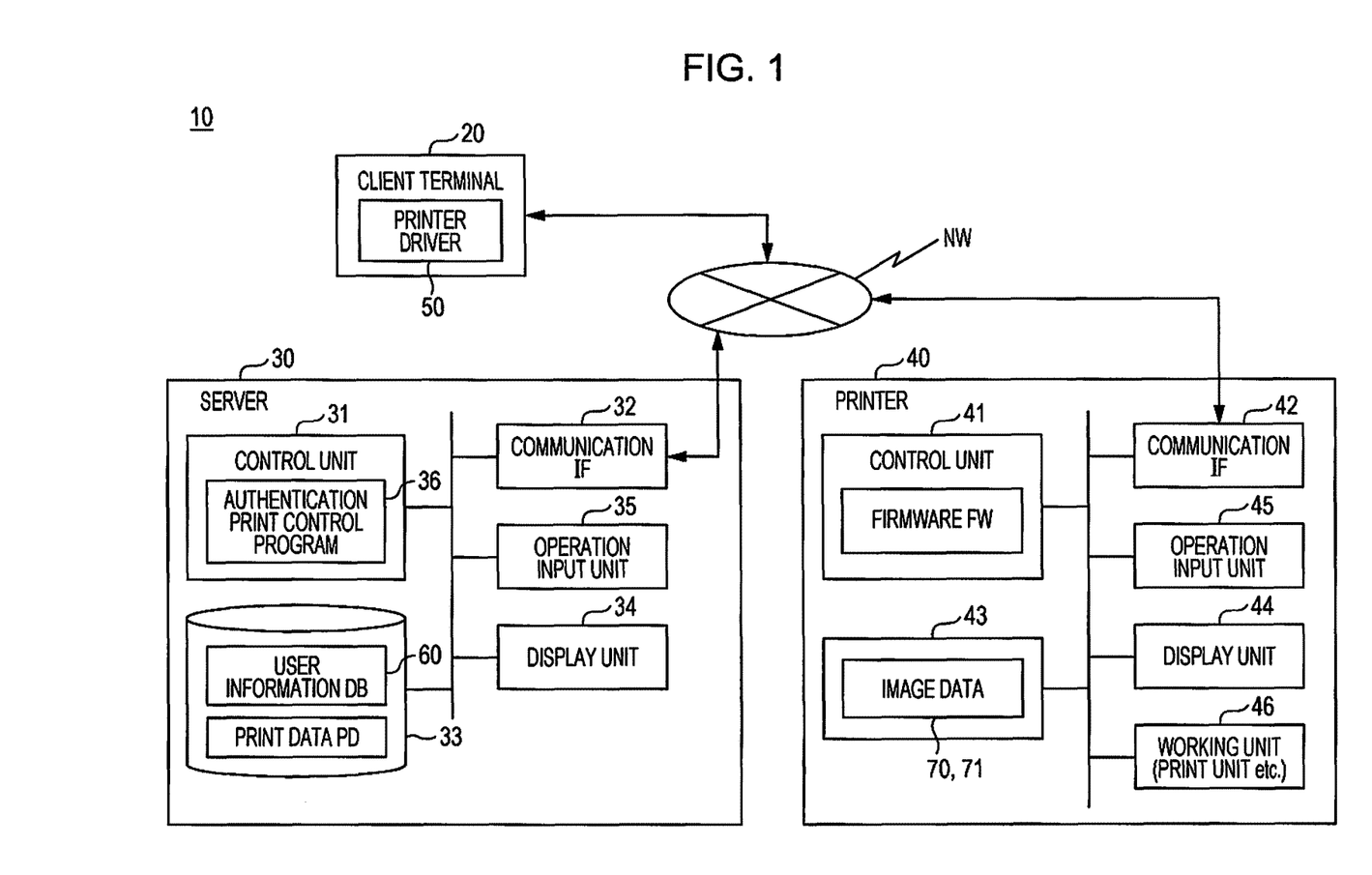
FIG. 1 is a schematic diagram illustrating the structure of a system.

FIG. 1 illustrates in a simple manner a system 10 according to an embodiment. The system 10 includes a client terminal 20 and a server 30. The system 10 further includes a printer 40 as one type of device administrated via the server 30. The printer 40 is a device functioning as, at least, a printer and may be a multifunction device that incorporates the functionality of multiple devices, such as a scanner and fax, in one. The type of device administrated via the server 30 according to the embodiment is not limited to a printer. Any type of device capable of presenting a user with a UI screen can be administrated via the server 30. The system 10, in whole or in part, may be referred to as an authentication print system. The server 30 administers and controls the authentication print system and may thus be referred to as, for example, an authentication print administration system. The server 30 is a tangible example of an information processing apparatus according to the invention.

The client terminal 20, the server 30, and the printer 40 have individual network communication functions and have the ability to communicate with one another over a network NW. The network NW may include a local area network (LAN) and the Internet. The network NW may be either a wired network or a wireless network. Although the system 10 illustrated in FIG. 1 includes one client terminal 20 and one printer 40, the system 10 may include multiple client terminals 20 and multiple printers 40. When there are multiple systems 10, the number of the servers 30 increases accordingly.

The client terminal 20 is, for example, a personal computer (PC), a smartphone, a tablet terminal, a mobile phone, or any other terminal equivalent in performance to these devices. A printer driver 50, which is a type of program, is installed on the client terminal 20. The printer driver 50 is a driver (a device driver) for controlling the printer 40. The client terminal 20 installs the printer driver 50 on itself, for example, by downloading the printer driver 50 from the server 30 over the network NW.

The server 30 includes a control unit 31, a communication interface (IF) 32, a storage unit 33, a display unit 34, and an operation input unit 35. The server 30 is implemented by at least one information processing apparatus functioning as a server. The control unit 31 includes, for example, a storage device and an integrated circuit (IC) incorporating a CPU, a ROM, a RAM, etc. In the control unit 31, the CPU executes computations according to programs stored in the ROM or in other storage by using the RAM or other storage as a working space, thus controlling the behavior of the server 30 and the printer 40. An authentication print control program 36 as one of these programs is installed on the control unit 31. The control unit 31 (as a display controller and a determiner described later) may be implemented by a single CPU or multiple CPUs, by a processing circuit, such as an application specific integrated circuit (ASIC), or by a combination of these structures.

The communication IF 32 communicates with external devices over the network NW according to a predetermined communication standard including known communication standards. The storage unit 33 includes a storage device, such as a hard disk drive or a flash memory, and a part of the control unit 31. A user information database (DB) 60 is stored on the storage unit 33. Further, the storage unit 33 temporarily stores print data PD generated by the printer driver 50.

The display unit 34 displays visual information and may be a liquid crystal display (LCD), an organic electroluminescent (EL) display, or other suitable display. The display unit 34 may include a display and a driver for driving the display. The operation input unit 35 is operable by a user to receive operational input from a user and may be a touchscreen, a physical button, a mouse, a keyboard, or other suitable input device. The display unit 34 may be also used as a touchscreen to receive operational input from a user. The display unit 34 and the operation input unit 35 may be external peripheral devices connected to the server 30.

The printer 40 includes a control unit 41, a communication IF 42, a storage unit 43, a display unit 44, an operation input unit 45, and a working unit 46. The control unit 41 includes, for example, a storage device and an IC incorporating a CPU, a ROM, and a RAM, etc. In the control unit 41, the CPU executes computations according to firmware FW stored in the ROM or in other storage by using the RAM or other storage as a working space, thus controlling the behavior of each unit of the printer 40 including the working unit 46. The descriptions made above for the communication IF 32, the display unit 34, and the operation input unit 35 are substantially applicable to the communication IF 42, the display unit 44, and the operation input unit 45, respectively. The display unit 44 and the operation input unit 45 may be collectively referred to as an operation panel of the printer 40. The storage unit 43 includes a storage device, such as a hard disk drive or a flash memory, and a part of the control unit 41. The storage unit 43 stores image data used to display a UI screen.

The working unit 46 is a collective term for units that implement functions of the printer 40 (as a multifunction device). For example, the working unit 46 includes the following: a print unit for performing printing based on the print data PD; a scanner unit for optically scanning an original document and for generating a scanned copy (image data); a fax communication unit for performing fax communication (both transmission and reception); and an electronic mail communication unit for performing electronic mail communication (both transmission and reception). The print unit, the scanner unit, the fax communication unit, and the electronic mail communication unit of the working unit 46 have known structures, and therefore, detailed descriptions thereof are omitted.

An example of how the authentication print system performs authentication printing is briefly described below. A user logs on to an operating system (OS) of the client terminal 20 by operating the client terminal 20, for example, by entering unique predetermined identification information (i.e., information, such as an identification (ID) code or a password, unique to each user of the authentication print system), thus activating the printer driver 50. The printer driver 50 (specifically, a control component of the client terminal 20 that executes the printer driver 50) generates the print data PD by applying predetermined processing, such as image processing or conversion processing, to an image that is selected by a user (i.e., a logged-on user) who logs on to print the image. The printer driver 50 transmits the generated print data PD from the client terminal 20 to the server 30 over the network NW. The print data PD may be, for example, raster data that forms the image to be printed.

The print data PD has, added thereto, the user identification information of a logged-on user and print setting information including a print setting that the printer driver 50 receives through an operation performed using the client terminal 20. The print setting defines various print conditions and includes, for example, the following: paper size; a scale factor (an enlargement or reduction ratio); color printing or black and white printing; single-sided printing or double-sided printing; bordered printing or borderless printing; and number of copies. The print data PD, the user identification information, and the print setting information may be collectively referred to as a print job. In the server 30, the communication IF 32 receives the print data PD (the print job) over the network NW, and the control unit 31 stores the print data PD on the storage unit 33. It is noted that the user identification information of each user is preregistered in the user information DB 60 stored on the storage unit 33. When the user identification information added to the print data PD received from an outside source matches any of the user identification information registered in the user information DB 60, the control unit 31 stores the print data PD on the storage unit 33.

A user enters their user identification information into the printer 40. Any suitable method can be used to enter the user identification information into the printer 40. For example, the printer 40 may be provided with a card reader, and a user may scan an IC card or other readable card having their user identification information stored thereon by using the card reader, thereby entering the user identification information into the printer 40. Alternatively, a user may enter their own user identification information into the printer 40 by operating the operation input unit 45 of the printer 40. When the user identification information of a user is entered into the printer 40, the user logs on to the printer 40. In the printer 40 that receives the entered user identification information, the control unit 41 transmits a print data confirmation request including the entered user identification information to the server 30 over the network NW.

In the server 30 that receives the print data confirmation request, the control unit 31 executes the authentication print control program 36, thereby controlling the authentication printing as follows. First, the control unit 31 determines whether or not the storage unit 33 has, stored thereon, the print data PD that is stored along with the user identification information matching the user identification information included in the received print data confirmation request. If such print data PD is stored, the control unit 31 transmits, over the network NW, a notification (hereinafter referred to as a data presence notification) indicating the presence of the print data PD that is printable to a source device (the printer 40) that transmits the print data confirmation request.

In the printer 40 that receives the data presence notification, the control unit 41 causes the display unit 44 to display, as part of the UI screen (refer to FIG. 4A or FIG. 4B), information (e.g., file names of the print data PD items) about each of the printable print data PD items indicated by the data presence notification. When a user selects the print data PD displayed on the display unit 44 and instructs the control unit 41 to print the selected print data PD, the control unit 41 transmits, to the server 30 over the network NW, an authentication print request including information that specifies the selected print data PD.

In the server 30 that receives the authentication print request, the control unit 31 generates a print command on the basis of the following: the print data PD stored on the storage unit 33 and specified by the received authentication print request; and the print setting information stored on the storage unit 33 along with the specified print data PD. The print command is information that the printer 40 interprets to perform printing. For example, the print command may be in a page description language (PDL) format. The control unit 31 transmits, over the network NW, the generated print command to the source device (the printer 40) that transmits the authentication print request.

In the printer 40 that receives the print command as a response to the authentication print request, the control unit 41 performs printing by interpreting the received print command. Specifically, the control unit 41 controls the print unit of the working unit 46 on the basis of the print command so that the print unit outputs a printed copy. Thus, only a user who has corresponding user identification information registered in the server 30 (specifically, in the user information DB 60) and who logs on to the printer 40 is allowed to perform and complete the authentication print. The printer 40 may inform the server 30 of the result of printing performed on the basis of the print command.

2. Display Setting in Accordance with Manner of Installation

Figure 2:
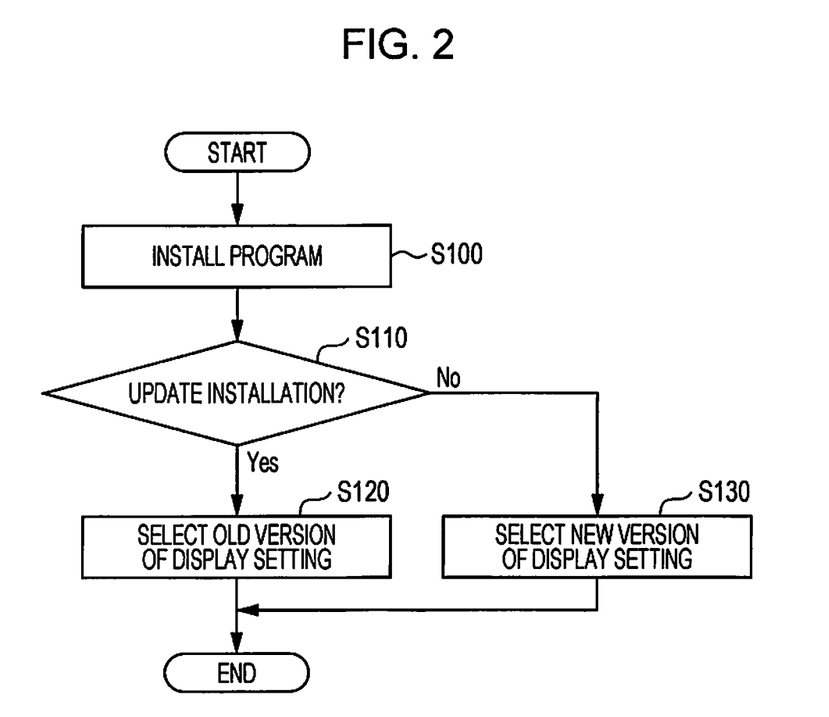
FIG. 2 is a flowchart illustrating a display setting process associated with a program installation.

FIG. 2 is a flowchart illustrating a process performed by the control unit 31 of the server 30 when installing the authentication print control program 36 and, in particular, illustrating a display setting process associated with the installation. For the sake of convenience, a user who operates the server 30 is hereinafter referred to as an administrator of the system 10. The control unit 31 performs an installation of the authentication print control program 36 when an administrator operates the operation input unit 35 in a predetermined manner (step S100). A storage source having program data therein that forms the authentication print control program 36 is not limited to a specific source. For example, the storage source may be an external storage device, such as an optical disk or a portable memory, inserted into, or attached to, the server 30, or may be another server (e.g., a cloud server accessible over the Internet), which is not illustrated, accessible from the server 30 over the network NW.

The control unit 31 downloads the program data from the storage source in response to an instruction from an administrator and installs the authentication print control program 36 on itself on the basis of the downloaded program data. Alternatively, if an automatic update feature of the authentication print control program 36 is enabled, the control unit 31 can automatically install the authentication print control program 36 as needed without any intervention from an administrator. In this case, the control unit 31 communicates with a server (not illustrated) that serves as the storage source and that is accessible over the network NW, thus automatically downloading the program data and installing the authentication print control program 36 on itself on the basis of the downloaded program data (step S100).

Next, the control unit 31 performs step S110 and subsequent procedures according to the authentication print control program 36 installed at step S100. At step S110, the control unit 31 determines whether a manner of installation in which the authentication print control program 36 is installed at step S100 corresponds to an update installation or a new installation. The update installation updates the authentication print control program 36 previously installed (hereinafter sometimes referred to as a first program) with the authentication print control program 36 to be installed at this time (hereinafter sometimes referred to as a second program). The new installation freshly installs the authentication print control program 36. The control unit 31 determines whether the manner of installation corresponds to the update installation or the new installation by determining whether or not an old version of the authentication print control program 36 (the first program) that has a version older than that of the authentication print control program 36 (the second program) installed at this time has been installed on the server 30.

The control unit 31 determines that the present manner of installation corresponds to the update installation, for example, if the storage unit 33 has stored thereon any of the following at the time when step S100 is started: program data corresponding to the old version of the authentication print control program 36 (the first program); registration information regarding the user information DB 60 and the printer 40 that performs the authentication printing; and information regarding the authentication printing, such as the print data PD associated with the user identification information. Further, the control unit 31 may determine that the present manner of installation corresponds to the update installation if the authentication print control program 36 to be installed (the second program) at this time is installed at step S100 while the old version of the authentication print control program 36 (the first program) is uninstalled at step S100. In the case of a new installation, the server 30 does not contain the first program at the time when step S100 is started. The control unit 31 makes such determination at step S110, thereby functioning as a determiner that determines whether or not the manner of installation corresponds to the update installation.

If determining at step S110 that the manner of installation corresponds to the update installation, the control unit 31 proceeds to step S120. In contrast, if determining at step S110 that the manner of installation corresponds to the new installation, the control unit 31 proceeds to step S130.

At step S120, the control unit 31 selects an old version of a display setting (hereinafter sometimes referred to as a first display setting) and ends the process in the flowchart. The old version of the display setting causes a predetermined display unit to display a UI screen (hereinafter sometimes referred to as a first UI screen) corresponding to the old version of the authentication print control program 36, i.e., the authentication print control program 36 (the first program) installed before the update installation is performed at step S100.

On the other hand, at step S130, the control unit 31 selects a new version of the display setting (hereinafter sometimes referred to as a second display setting) and ends the process in the flowchart. The new version of the display setting causes the predetermined display unit to display a UI screen (hereinafter sometimes referred to as a second UI screen) corresponding to the authentication print control program 36 installed at this time, i.e., the authentication print control program 36 (the second program) installed at step S100. As can be seen from how the expressions "first" and "second" are used so far to describe the embodiment, these expressions are used only for the purpose of distinguishing different versions (one version is older or newer than the other) of each of the program and the UI screen from each other.

According to the embodiment, the display unit 44 of the printer 40 administrated via the server 30 is the predetermined display unit. Specifically, at step S120, the control unit 31 transmits, over the network NW, image data 70 (hereinafter sometimes referred to as first data) used to display the first UI screen to the printer 40 that is recognizable by the control unit 31, thereby causing the display unit 44 of the printer 40 to display the first UI screen based on the image data 70. On the other hand, at step S130, the control unit 31 transmits, over the network NW, image data 71 (hereinafter sometimes referred to as second data) used to display the second UI screen to the printer 40 that is recognizable by the control unit 31, thereby causing the display unit 44 of the printer 40 to display the second UI screen based on the image data 71. The control unit 31 performs step S120 or step S130, thereby functioning as a display controller that determines the display setting for the UI screen in accordance with the manner of installation.

The program data that the server 30 downloads as described above to install the authentication print control program 36 includes not only the image data 71 used to display the UI screen (the second UI screen) corresponding to the authentication print control program 36 to be installed, but also the image data 70 used to display the UI screen (the first UI screen) corresponding to the old version of the authentication print control program 36, except when the authentication print control program 36 to be installed is the initial version. Thus, when performing the update installation, the server 30 already has the image data 70 used to display the UI screen (the first UI screen) corresponding to the old version of the authentication print control program 36. This makes it possible that the server 30 transmits the image data 70 to the printer 40 when the determination made at step S110 leads to step S120 and that the server 30 transmits the image data 71 to the printer 40 when the determination made at step S110 leads to step S130.

When receiving the image data 70 from the server 30, the control unit 41 of the printer 40 stores the image data 70 on the storage unit 43 and causes the display unit 44 to display the first UI screen based on the image data 70. On the other hand, when receiving the image data 71 from the server 30, the control unit 41 stores the image data 71 on the storage unit 43 and causes the display unit 44 to display the second UI screen based on the image data 71.

Figure 3A:
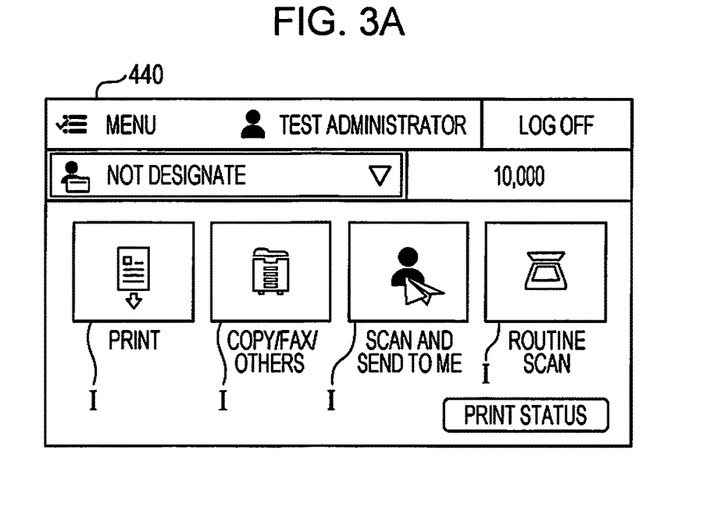
FIG. 3A is a diagram illustrating an example of a UI screen displayed when an old version of a display setting is selected.
Figure 3B:
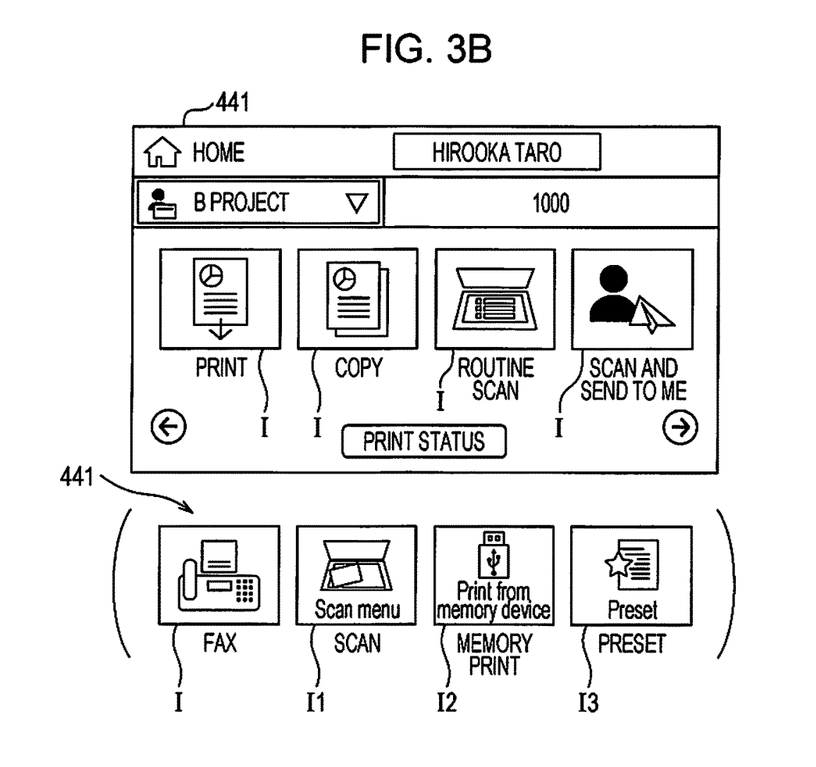
FIG. 3B is a diagram illustrating an example of the UI screen displayed when a new version of the display setting is selected.

FIG. 3A illustrates a UI screen 440 (as an example of the first UI screen) displayed on the display unit 44 when the old version of the display setting is selected. FIG. 3B illustrates a UI screen 441 (as an example of the second UI screen) displayed on the display unit 44 when the new version of the display setting is selected.

The UI screens 440 and 441 are each a home screen displayed on the display unit 44, for example, when a user logs on to the printer 40 as already described by entering the user identification information. As can be seen by comparing FIG. 3A and FIG. 3B, the UI screens 440 and 441 have different designs and layouts of various elements including multiple icons I associated with the functions of the printer 40, such as printing, copying, and faxing. Further, an operation, such as scrolling, by a user enables the UI screen 441 corresponding to the new version of the display setting to display more kinds of icons I on the home screen than the UI screen 440 corresponding to the old version of the display setting.

For example, as shown in brackets in FIG. 3B, additional icons, such as an icon I1 "Scan", an icon I2 "Memory Print", and an icon I3 "Preset", are displayed on the UI screen 441 in response to the scrolling operation. For example, a user operates the icon I1 "Scan" on the UI screen 441 to display a more detailed menu for scanning on the display unit 44 and causes the printer 40 to perform a desired scanning process. Examples of the desired scanning process include sending scanned data of an original document to a desired address by electronic mail and sending scanned data of an original document to a desired storage so that the scanned data can be stored on the desired storage. In the case where the UI screen 440 is displayed, although none of the icons I1, I2, and I3 are on the home screen, a predetermined operation by a user on the UI screen 440 enables the printer 40 to perform the same process as that performed by the printer 40 when any of the icons I1, I2, and I3 on the UI screen 441 is operated.

Figure 4A:
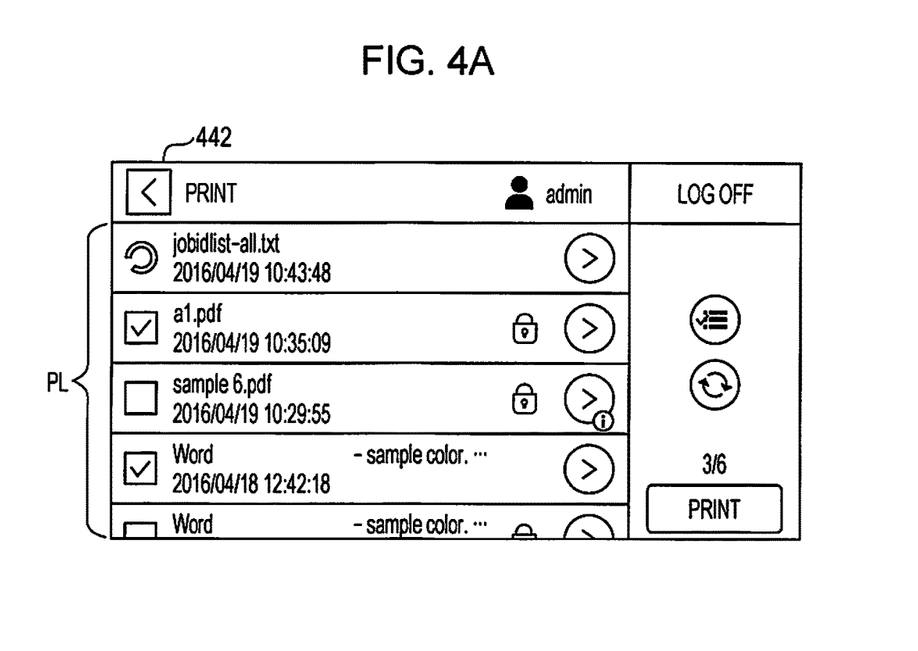
FIG. 4A is a diagram illustrating another example of the UI screen displayed when the old version of the display setting is selected.
Figure 4B:
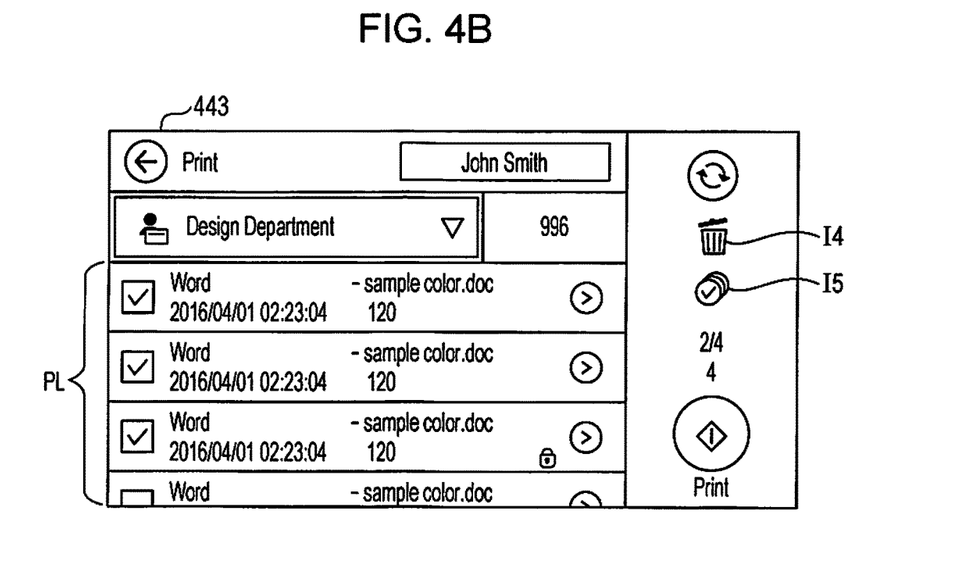
FIG. 4B is a diagram illustrating another example of the UI screen displayed when the new version of the display setting is selected.

FIG. 4A illustrates a UI screen 442 (as another example of the first UI screen) displayed on the display unit 44 when the old version of the display setting is selected. FIG. 4B illustrates a UI screen 443 (as another example of the second UI screen) displayed on the display unit 44 when the new version of the display setting is selected.

The UI screens 442 and 443 are each includes a print data list PL that lists information (e.g., file names of the print data PD) about each of the print data PD indicated by the data presence notification that the printer 40 receives from the server 30. In short, the UI screens 442 and 443 are each a UI screen regarding the authentication printing. When the old version of the display setting is selected, a user can switch a screen displayed on the display unit 44 between the UI screens 440 and 442 by performing a predetermined operation. On the other hand, when the new version of the display setting is selected, a user can switch the screen displayed on the display unit 44 between the UI screens 441 and 443 by performing a predetermined operation.

As can be seen by comparing FIG. 4A and FIG. 4B, the UI screens 442 and 443 have different designs and layouts. The UI screen 443 corresponding to the new version of the display setting has display items and icons that are not included in the UI screen 442 corresponding to the old version of the display setting. For example, the UI screen 443 has a delete icon I4 used to delete the print data PD selected in the print data list PL and an all select icon I5 used to select all the print data PD items listed in the print data list PL. Further, the cost of the authentication printing for each of the print data PD items listed in the print data list PL is displayed on the UI screen 443, for example, as a number, such as "120". The cost is notified by the server 30 and represents an individual fee that a user is changed for printing out each of the print data PD items from the printer 40.

Regardless of whether the old version of the display setting is selected at step S120 or the new version of the display setting is selected at step S130, the server 30 is allowed to use functions of the authentication print control program 36 installed at step S100 (i.e., the latest version of the authentication print control program 36 at the present time). However, if the old version of the display setting is selected at step S120, the UI screen 440 or 442 (refer to FIG. 3A or FIG. 4A) corresponding to the old version of the display setting is displayed on the display unit 44 of the printer 40. Thus, when a user of the printer 40 performs an operation for the authentication printing, the UI screen 442 allows a user to use the functions common to those of the old version of the authentication print control program 36, out of all the functions of the authentication print control program 36 installed at this time on the server 30. For example, assuming that the authentication print control program 36 installed at this time on the server 30 has a function that notifies the printer 40 of the cost of the authentication printing for each of the print data PD items so that the printer 40 displays the cost. In this case, if the old version of the display setting is selected, and the UI screen 442 is displayed on the display unit 44 of the printer 40, the cost is not displayed on the display unit 44. However, the UI screen 440 or 442 that a user has been used to since before the update installation of the authentication print control program 36 is still displayed on the display unit 44 even after the update installation, thus enabling a user to operate the printer 40 comfortably without feeling any inconvenience.

On the other hand, if the new version of the display setting is selected at step S130, the UI screen 441 or 443 (refer to FIG. 3B or FIG. 4B) corresponding to the new version of the display setting is displayed on the display unit 44 of the printer 40. Thus, when a user of the printer 40 performs an operation for the authentication printing, the UI screen 443 enables a user to use all the functions of the authentication print control program 36 installed at this time on the server 30. For example, assuming that the authentication print control program 36 installed at this time on the server 30 has a function that notifies the printer 40 of the cost of the authentication print for each of the print data PD items so that the printer 40 displays the cost. In this case, if the new version of the display setting is selected, and the UI screen 443 is displayed on the display unit 44 of the printer 40, the cost is displayed on the display unit 44. A user will naturally accept the UI screens 441 and 443 because a user sees the UI screens 441 and 443 for the first time when the new installation of the authentication print control program 36 is performed, that is, because a user does not know the UI screens 440 and 442.

As described above, according to the embodiment, an information processing apparatus (the server 30) that performs a program installation determines whether or not a manner of installation in which the installation is performed corresponds to an update installation that updates a program (the first program) previously installed with a program (the second program) to be installed at this time (step S110). If the manner of installation corresponds to the update installation ("Yes" at step S110), the information processing apparatus selects an old version of a display setting (the first display setting) that causes a predetermined display unit (the display unit 44 of the printer 40) to display a first UI screen corresponding to the first program (step S120). In contrast, if the manner of installation does not correspond to the update installation (i.e., if the manner of installation corresponds to the new installation, "No" at step S110), the information processing apparatus selects a new version of the display setting (the second display setting) that causes the predetermined display unit to display a second UI screen corresponding to the second program (step S130). This allows a user who is used to a UI screen displayed before the update installation of a program to perform an operation comfortably without feeling the inconvenience caused by a UI screen change. Further, when the new installation of the program is performed, a user is presented with the latest version of the UI screen corresponding to the installed program.

3. Other Embodiments

Other embodiments of the invention are described below. The embodiment (defined herein as a first embodiment) described above and embodiments described below can be combined in any suitable manner.

Second Embodiment

After the authentication print control program 36 is installed at step S100, the control unit 31 causes a second display unit to display the second UI screen corresponding to the authentication print control program 36 (the second program) installed at step S100, regardless of whether the old version of the display setting (the first display setting) or the new version of the display setting (the second display setting) is selected, that is, regardless of the result of determination made at step S110. The second display unit is specifically the display unit 34 of the server 30. This structure allows an administrator of the server 30 to operate the server 30 while viewing, on the display unit 34, the second UI screen corresponding to the latest version of the authentication print control program 36 installed on the server 30.

Third Embodiment

After selecting the old version of the display setting (the first display setting), the control unit 31 is allowed to make a change from the old version of the display setting to the new version of the display setting (the second display setting) in accordance with an external operation. Likewise, after selecting the new version of the display setting, the control unit 31 is allowed to make a change from the new version of the display setting to the old version of the display setting in accordance with the external operation. It is assumed here that the control unit 31 selects the old version of the display setting at step S120 as already described. After that, when receiving a change command that is issued by operating the operation input unit 35 and that instructs the control unit 31 to change the display setting for the predetermined display unit (the display unit 44 of the printer 40) to the new version of the display setting, the control unit 31 performs the same procedure as that performed at step S130, thus changing the display setting for the predetermined display unit to the new version of the display setting. It is assumed here that the control unit 31 selects the new version of the display setting at step S130 as already described. After that, when receiving a change command that is issued by operating the operation input unit 35 and that instructs the control unit 31 to change the display setting for the predetermined display unit (the display unit 44 of the printer 40) to the old version of the display setting, the control unit 31 performs the same procedure as that performed at step S120, thus changing the display setting for the predetermined display unit to the old version of the display setting. Thus, this structure allows a user (or an administrator) to change the display setting freely even after one of the old version of the display setting and the new version of the display setting is once selected in accordance with the result of determination made at step S110.

Fourth Embodiment

When receiving, from a device (the printer 40), a change command that is associated with a user and that instructs the control unit 31 to change the selected display setting, the control unit 31 changes the selected display setting to one of the old version of the display setting (the first display setting) and the new version of the display setting (the second display setting) in compliance with the change command only while the user operates the device. A user who logs on to the printer 40 by entering their user identification information into the printer 40 as already described is allowed to enter the change command to change the display setting presently selected for the display unit 44 by operating the operation input unit 45.

When receiving the change command, the printer 40 transmits, to the server 30 over the network NW, the change command along with the user identification information of a user logging on to the printer 40. When receiving the change command along with the user identification information from the printer 40, the control unit 31 of the server 30 transmits a notification (hereinafter referred to as a display change allowance notification) to the printer 40 that transmits the change command. The display change allowance notification allows the printer 40 to change the present display setting only while a user associated with the user identification information logs on to the printer 40. In addition to the display change allowance notification, the control unit 31 transmits, to the printer 40, the image data (the image data 70 or the image data 71) used to display the UI screen corresponding to the display setting (the old version of the display setting or the new version of the display setting) different from the present display setting.

After receiving the image data along with the display change allowance notification, the control unit 41 of the printer 40 causes the display unit 44 to display the UI screen based on the received image data only while a user associated with the user identification information transmitted along with the change command to the server 30 logs on to the printer 40, i.e., only until the user logs out after logging on. For example, if the control unit 31 selects the old version of the display setting at step S120 as already described, the first UI screen (e.g., the UI screen 440 or 442) corresponding to the old version of the display setting is displayed on the display unit 44 of the printer 40. It is assumed that a user logs on to the printer 40 and enters the change command in this situation. The change command is transmitted to the server 30 along with the user identification information of the user so that the second UI screen (e.g., the UI screen 441 or 443) corresponding to the new version of the display setting is then displayed on the display unit 44 of the printer 40 only while the user logs on to the printer 40.

On the other hand, if the control unit 31 selects the new version of the display setting at step S130 as already described, the second UI screen (e.g., the UI screen 441 or 443) corresponding to the new version of the display setting is displayed on the display unit 44 of the printer 40. It is assumed that a user logs on to the printer 40 and enters the change command in this situation. The change command is transmitted to the server 30 along with the user identification information of the user so that the first UI screen (e.g., the UI screen 440 or 442) corresponding to the new version of the display setting is then displayed on the display unit 44 of the printer 40 only while the user logs on to the printer 40. This structure allows the server 30 not only to select either the old version of the display setting or the new version of the display setting in accordance with the result of determination made at step S110, but also to change the display setting to suit the preference of a user on a user basis only while the user operates a device (the printer 40).

The description above for the embodiments relates to the installation (the update installation or the new installation) of the authentication print control program 36 that administers and controls the authentication printing, and also relates to the display setting for the UI screen corresponding to the program 36. Nevertheless, the idea of the invention is applicable to any case where a program is installed on an information processing apparatus and where a UI screen is changeable in accordance with the installation.

The entire disclosure of Japanese Patent Application No. 2016-229842, filed Nov. 28, 2016 is expressly incorporated by reference herein.

What is claimed is:

1. An information processing apparatus that performs a program installation, the information processing apparatus comprising:
   at least one processor that executes a plurality of computations based on a first program that has been installed on the information processing apparatus and a second program that is installable on the information processing apparatus after the first program, the at least one processor including
      a determiner that determines whether or not a manner of installation of the second program corresponds to an update installation that updates the first program with the second program; and
      a display controller that
         causes a predetermined display to display a first interface screen corresponding to the first program before the determiner determines whether or not the manner of installation is the update installation,
         selects, when the manner of installation corresponds to the update installation, a first display setting for causing the predetermined display to display the first user interface screen, and
         select, when the manner of installation does not correspond to the update installation, a second display setting for causing the predetermined display to display a second user interface screen corresponding to the second program.

2. The information processing apparatus according to claim 1, wherein
   the information processing apparatus administrates a device having the predetermined display over a network,
   when selecting the first display setting, the display controller transmits, to the device, first data used to display the first user interface screen, thereby causing the predetermined display of the device to display the first user interface screen based on the first data, and
   when selecting the second display setting, the display controller transmits, to the device, second data used to display the second user interface screen, thereby causing the predetermined display of the device to display the second user interface screen based on the second data.

3. The information processing apparatus according to claim 1, further comprising:
   a second display unit different from the predetermined display, wherein
   regardless of whether the first display setting or the second display setting is selected, the display controller causes the second display unit to display the second user interface screen after the second program is installed.

4. The information processing apparatus according to claim 1, wherein
   the display controller is allowed, after selecting the first display setting, to make a change from the first display setting to the second display setting in accordance with an external operation, and
   the display controller is allowed, after selecting the second display setting, to make a change from the second display setting to the first display setting in accordance with the external operation.

5. The information processing apparatus according to claim 2, wherein
   when receiving, from the device, a change command that is associated with a user and that instructs the display controller to change the selected display setting, the display controller changes the selected display setting to one of the first display setting and the second display setting in compliance with the change command only while the user operates the device.

6. A non-transitory computer-readable medium having stored thereon, a program installable on an information processing apparatus, the program causing the information processing apparatus to function as:
   a determiner that determines whether or not a manner of installation in which the program is installed corresponds to an update installation that updates, with the program, a previous program which has been installed on the information processing apparatus prior to the program; and
   a display controller that
      causes a predetermined display to display a first user interface screen corresponding to the previously program installed before the determiner determines whether or not the manner of installation is the update installation,
      selects, when the manner of installation corresponds to the update installation, a first display setting for causing the predetermined display to display the first user interface screen, and
      selects, when the manner of installation does not corresponds to the update installation, a second display setting for causing the predetermined display to display a second user interface screen corresponding to the program.

7. The information processing apparatus according to claim 1, further comprising:
   a second display disposed as a separate and independent display from the predetermined display, wherein
   regardless of whether the first display setting or the second display setting is selected, the display controller causes the second display to display the second user interface screen after the second program is installed.

8. The information processing apparatus according to claim 1, wherein
the second program corresponds to a new version of the first program.

9. The non-transitory computer-readable medium according to claim 6, wherein
the program corresponds to a new version of the previous program.

* * * * *